United States Patent
Bollu et al.

(10) Patent No.: US 11,544,130 B2
(45) Date of Patent: Jan. 3, 2023

(54) WATCHDOG CIRCUIT, CIRCUIT, SYSTEM-ON-CHIP, METHOD OF OPERATING A WATCHDOG CIRCUIT, METHOD OF OPERATING A CIRCUIT, AND METHOD OF OPERATING A SYSTEM-ON-CHIP

(71) Applicant: Infineon Technologies AG, Neubiberg (DE)

(72) Inventors: Sai Kiran Bollu, Bangalore (IN); Ananth Kamath, Bangalore (IN)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/360,446

(22) Filed: Jun. 28, 2021

(65) Prior Publication Data

US 2021/0406111 A1    Dec. 30, 2021

(30) Foreign Application Priority Data

Jun. 26, 2020  (DE) .......................... 102020116959.0

(51) Int. Cl.
*G06F 11/07*     (2006.01)
*G06F 9/455*     (2018.01)

(52) U.S. Cl.
CPC ...... *G06F 11/0757* (2013.01); *G06F 9/45558* (2013.01); *G06F 11/0712* (2013.01); *G06F 2009/45591* (2013.01)

(58) Field of Classification Search
CPC ............ G06F 11/0757; G06F 11/0712; G06F 11/0754; G06F 9/45558; G06F 2009/45591
See application file for complete search history.

(56) References Cited

U.S. PATENT DOCUMENTS

| | | | | |
|---|---|---|---|---|
| 5,729,472 A | * | 3/1998 | Seiffert | G06F 11/3495 709/224 |
| 5,978,939 A | * | 11/1999 | Mizoguchi | G06F 11/0757 713/502 |
| 6,618,825 B1 | * | 9/2003 | Shaw | G06F 11/0724 714/48 |
| 10,606,675 B1 | * | 3/2020 | Luszczak | G06F 11/0793 |
| 2002/0116670 A1 | * | 8/2002 | Oshima | G06F 11/0712 714/E11.003 |
| 2005/0223302 A1 | | 10/2005 | Bono | |

(Continued)

*Primary Examiner* — Gabriel Chu
(74) *Attorney, Agent, or Firm* — Banner & Witcoff Ltd.

(57) ABSTRACT

A watchdog circuit for monitoring a plurality of virtual machines provided by one core of a plurality of cores. The watchdog circuit may include a first memory portion, a second memory portion, and a control logic configured to count a number of pulses, to, when starting the watchdog circuit, store a global watchdog counter value in the first memory portion, and to store a local counter value for each virtual machine of the one or more virtual machines in the second memory portion, and, after a predefined number of pulses, to modify the global watchdog counter value and the local counter values, and, if the global watchdog counter value fulfills a predefined global watchdog reference criterion or any of the local watchdog counter values fulfills a predefined local watchdog reference criterion, to output an error signal.

21 Claims, 10 Drawing Sheets

(56) References Cited

U.S. PATENT DOCUMENTS

| | | | |
|---|---|---|---|
| 2016/0170816 A1* | 6/2016 | Warkentin | G06F 9/45558 |
| | | | 719/320 |
| 2016/0239324 A1 | 8/2016 | Tsirkin | |
| 2016/0314057 A1* | 10/2016 | De Oliveira | G06F 11/182 |
| 2018/0225140 A1* | 8/2018 | Titus | G06F 9/5094 |
| 2019/0258251 A1 | 8/2019 | Ditty et al. | |

* cited by examiner

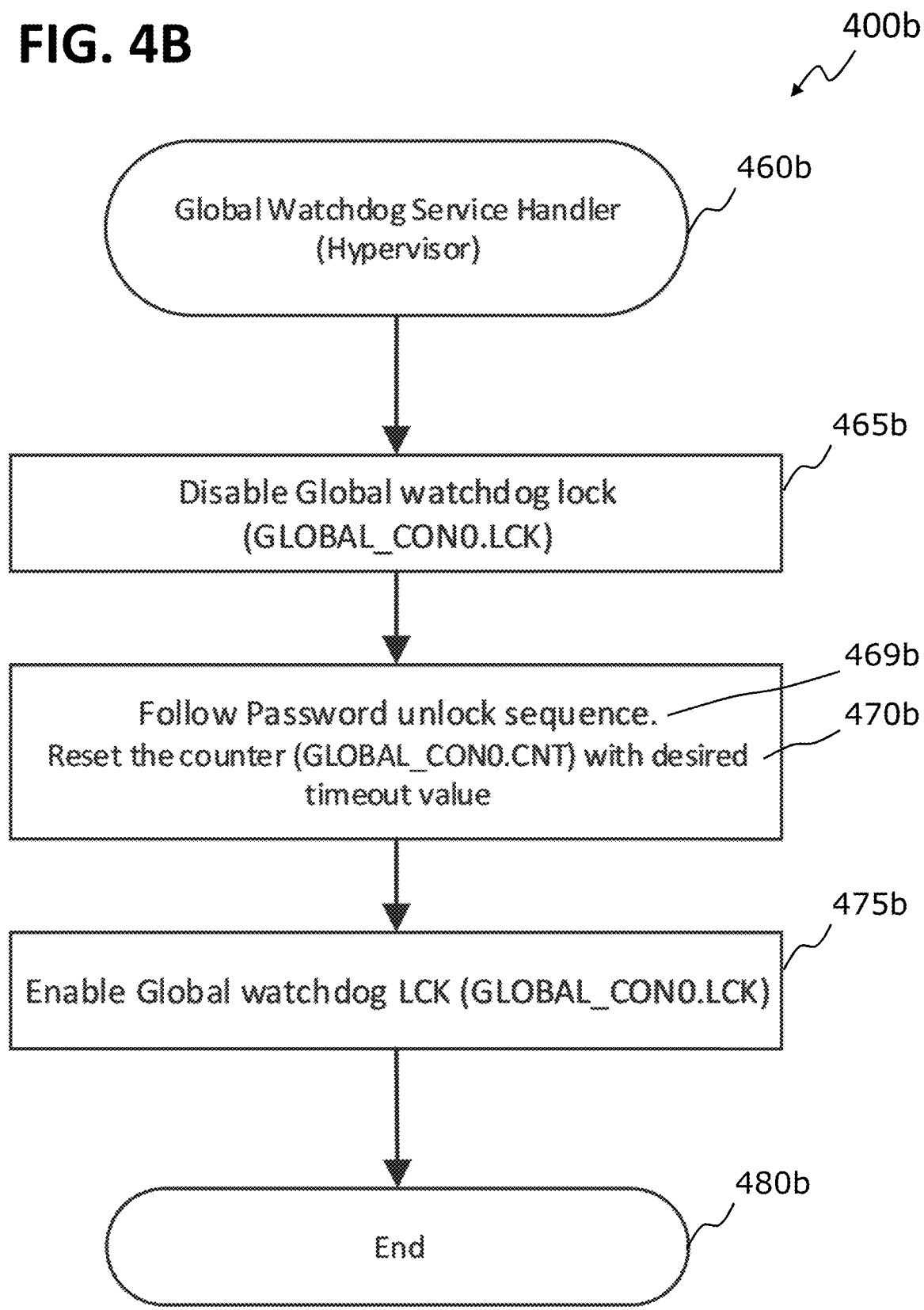

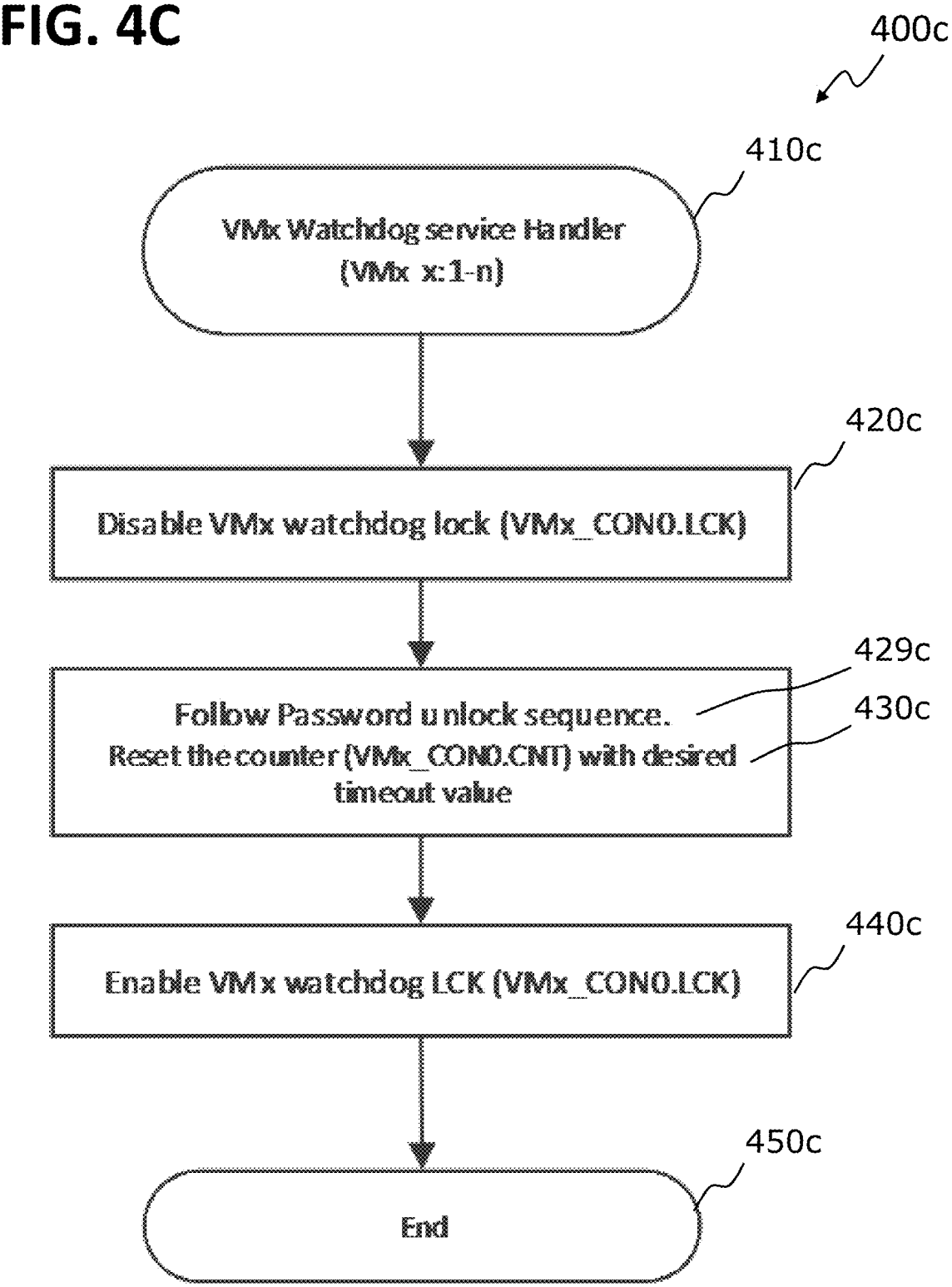

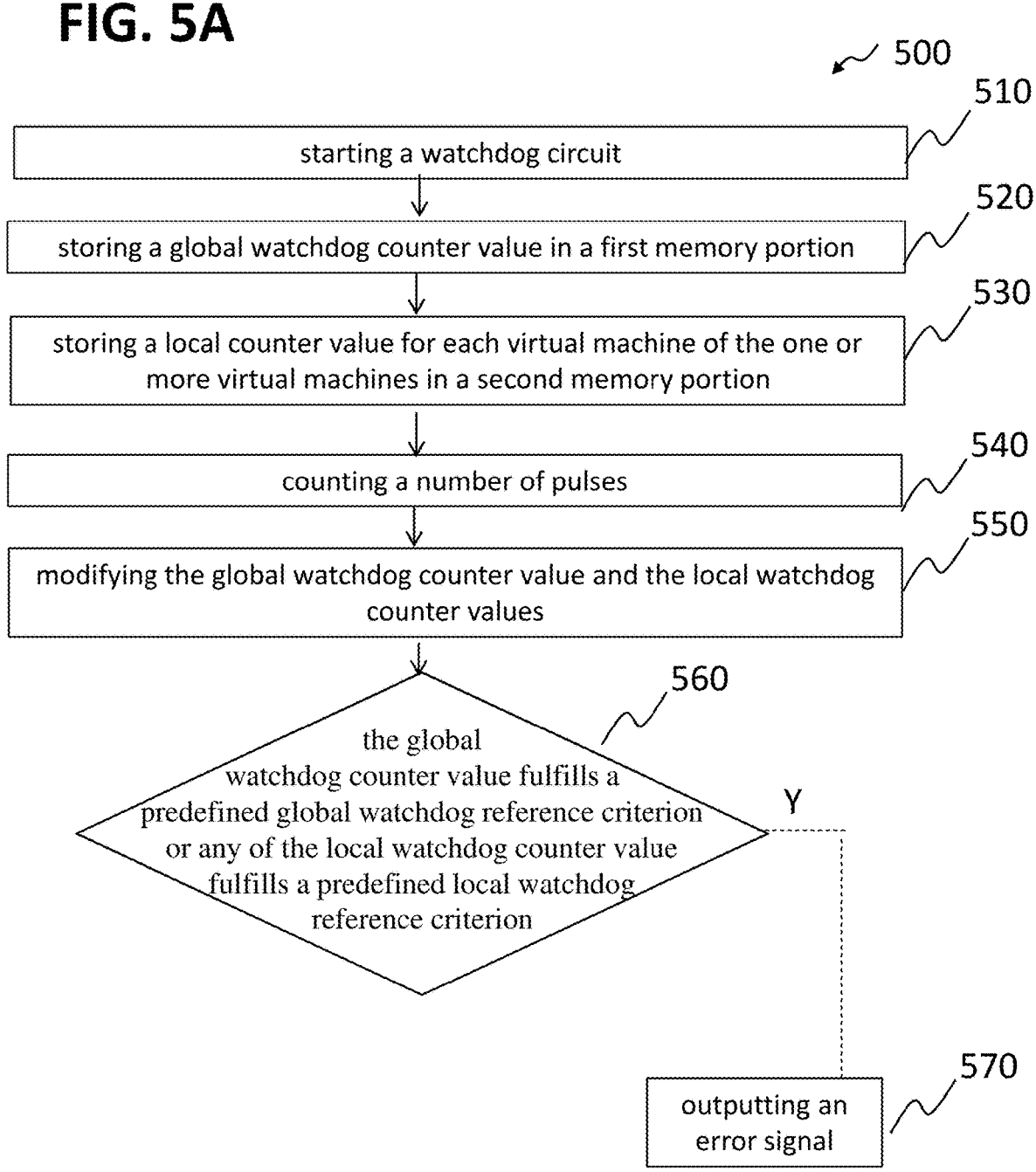

WATCHDOG CIRCUIT, CIRCUIT,
SYSTEM-ON-CHIP, METHOD OF
OPERATING A WATCHDOG CIRCUIT,
METHOD OF OPERATING A CIRCUIT, AND
METHOD OF OPERATING A
SYSTEM-ON-CHIP

TECHNICAL FIELD

Various embodiments relate generally to a watchdog circuit, to a system-on-chip, to a method of operating a watchdog circuit, and to a method of operating a system-on-chip.

BACKGROUND

In real time embedded systems, with an introduction of virtualization on multicore system-on-chips (SoCs), temporal program flow monitoring became challenging.

Currently, temporal monitoring is usually performed by dedicated watchdog timers. In case of multi-core systems, one watchdog timer per core is usually used. If virtualization is used, a single watchdog timer per core, along with software solutions, is used to perform the temporal monitoring.

A corresponding software-based watchdog system 100 for a processor (e.g. a multicore processor) with virtual machines is depicted in FIG. 1. The software may initialize a watchdog configuration, for example including setting, e.g. in a hardware memory 104, a time counter such that a sensible time limit before the watchdog raises an alarm 112 is specified. The software may further be configured to initialize similar counters 110—software-based, however—within each of the virtual machines.

A hypervisor that may be configured to run the virtual machines may also be configured to service the watchdog system 100, in other words, to reset the hardware counter. Furthermore, the hypervisor may be configured to decrement the counters of the active virtual machine counters. Each of the virtual machines may be configured to call the hypervisor, e.g. its application programming interface, to service the software virtual machine watchdog, in other words, to reset the software counters. Furthermore, it may be the hypervisor that monitors the software watchdog counters 110 and takes appropriate action, for example if one of the counters 110 is decremented to zero.

However, a disadvantage of this approach may be that the current solution is limited by a response time of the software. Furthermore, an overhead of the system due to a software handling of the software watchdog by the virtual machines may lead to a failure to meet real time criteria.

SUMMARY

A watchdog circuit for monitoring a plurality of virtual machines provided by one core of a plurality of cores. The watchdog circuit may include a first memory portion, a second memory portion, and a control logic configured to count a number of pulses, to, when starting the watchdog circuit, store a global watchdog counter value in the first memory portion, and to store a local counter value for each virtual machine of the one or more virtual machines in the second memory portion, and, after a predefined number of pulses, to modify the global watchdog counter value and the local counter values, and, if the global watchdog counter value fulfills a predefined global watchdog reference criterion or any of the local watchdog counter values fulfills a predefined local watchdog reference criterion, to output an error signal.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

each of FIG. 2A

Figure 4A:
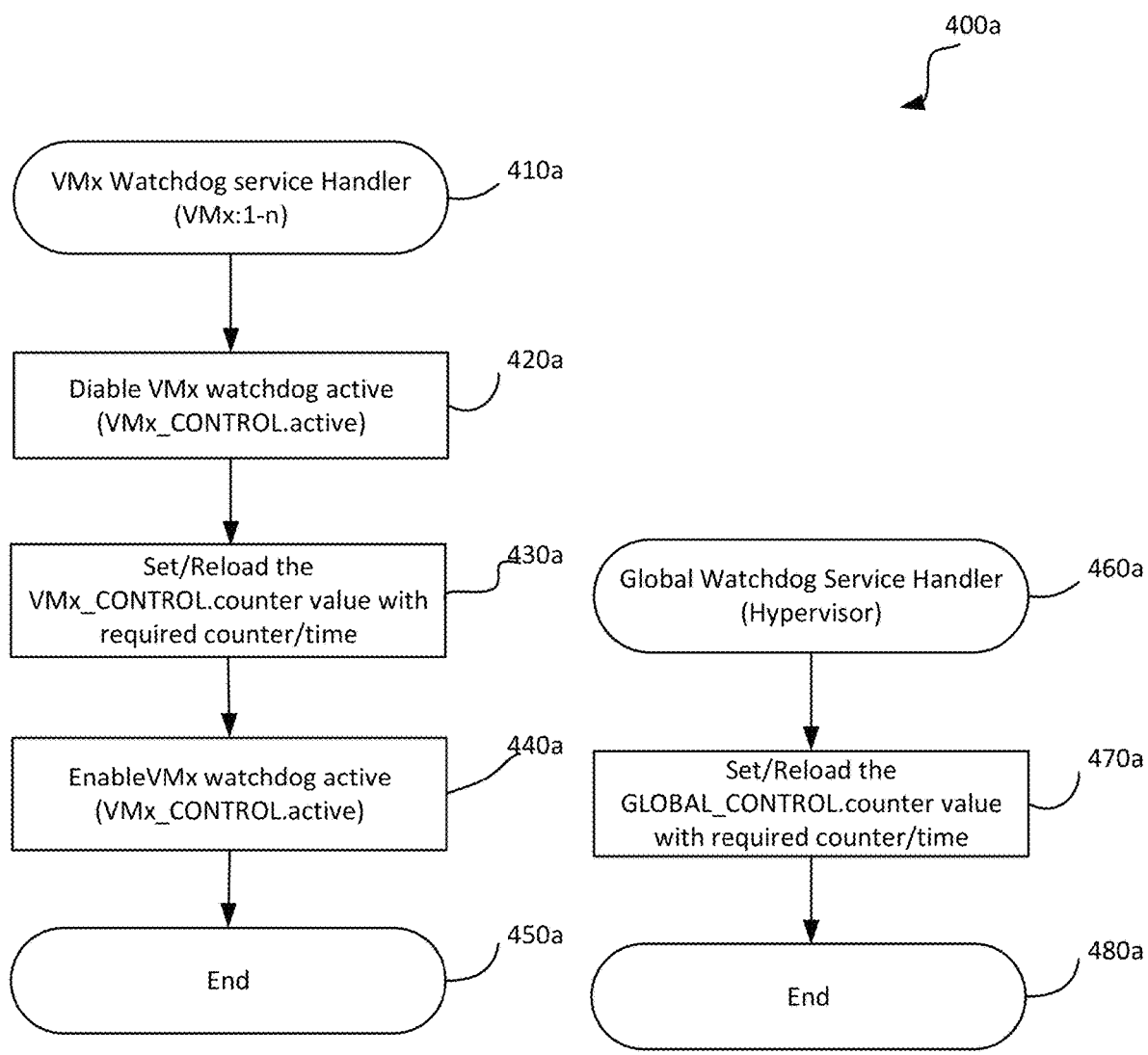
Figure 5B:
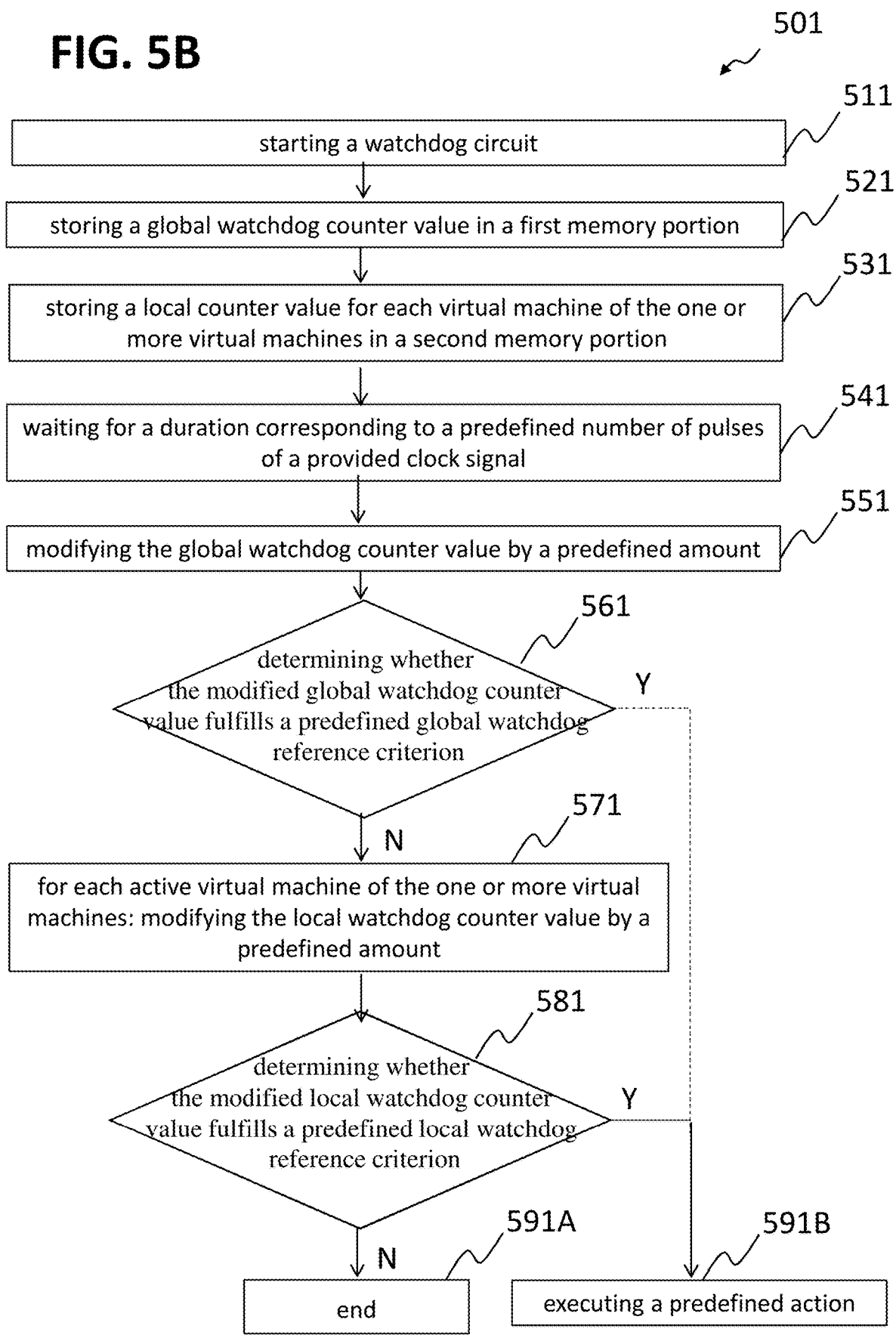
Figure 6:
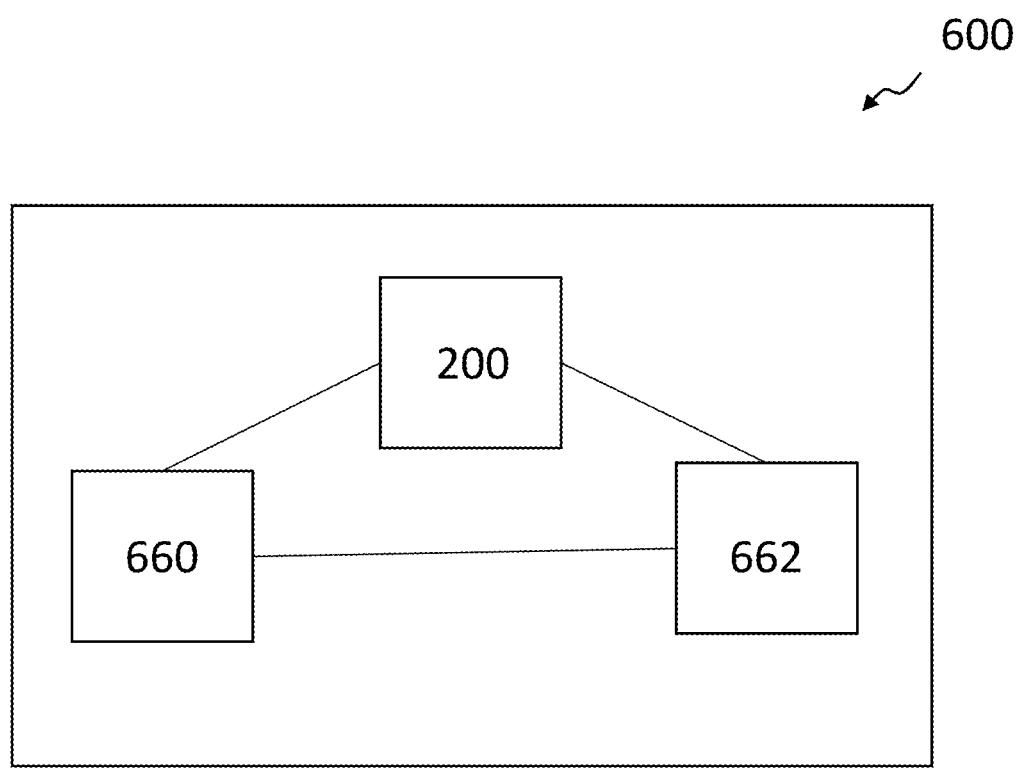

each of FIG. 4A to FIG. 4C shows flow diagrams of aspects of a method of operating a circuit in accordance with various embodiments;

each of FIG. 5A and FIG. 5B shows a flow diagram of a method of operating a watchdog circuit in accordance with various embodiments; and FIG. 6 shows a schematic view of a processing system in accordance with various embodiments.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various aspects of the disclosure are provided for devices, and various aspects of the disclosure are provided for methods. It will be understood that basic properties of the devices also hold for the methods and vice versa. Therefore, for sake of brevity, duplicate description of such properties may have been omitted.

In various embodiments, a watchdog circuit, also referred to as watchdog timer or simply as watchdog, with virtualization support is provided. In other words, in a system, for example a system-on-chip (SoC), that runs one or more virtual machines, a watchdog circuit may be provided that covers the virtual machines with its watchdog timer monitoring functionality. In a case where the system includes multiple cores, e.g. processor cores, one watchdog circuit per core may be provided. A hypervisor may be provided for monitoring the virtual machines.

Counters for monitoring when each of the virtual machines and the hypervisor last provided an indication that they are up and running properly may be stored in hardware memory, for example in dedicated registers.

The watchdog circuit and the virtual machines may interleave (essentially only) at the hardware memory, and in a decoupled fashion. This means that the virtual machines may reset counters stored in the memory in accordance with their own timing, and that the watchdog circuit may access the counters according to its own time frame to verify that the counters have been reset in a timely fashion by the virtual machines, but without a necessity to directly interact with the virtual machine software, to prompt the virtual machine for a response, or the like.

In various embodiments, the hardware component taking the decision on the retry may offload the (software) system.

In various embodiments, a faster response to watchdog events may be achieved. This means that a real time behavior may be achieved, since the virtual machine watchdog timer (e.g., the counters) is being handled by the hardware.

In various embodiments, a complexity and a footprint of the watchdog handler software may be reduced.

Figure 1:
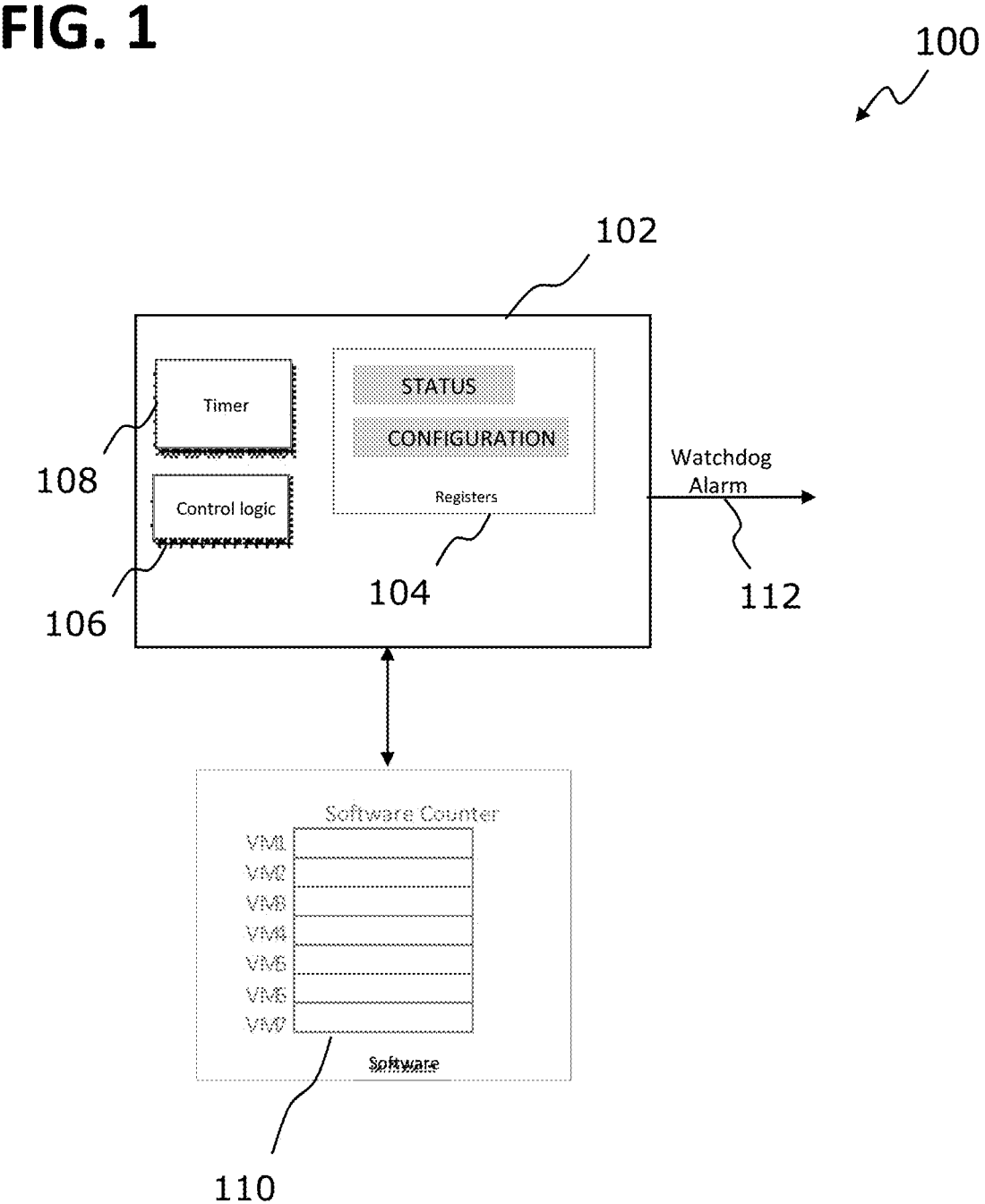
FIG. 1 shows a schematic view of a watchdog circuit according to the prior art.
Figure 2A:
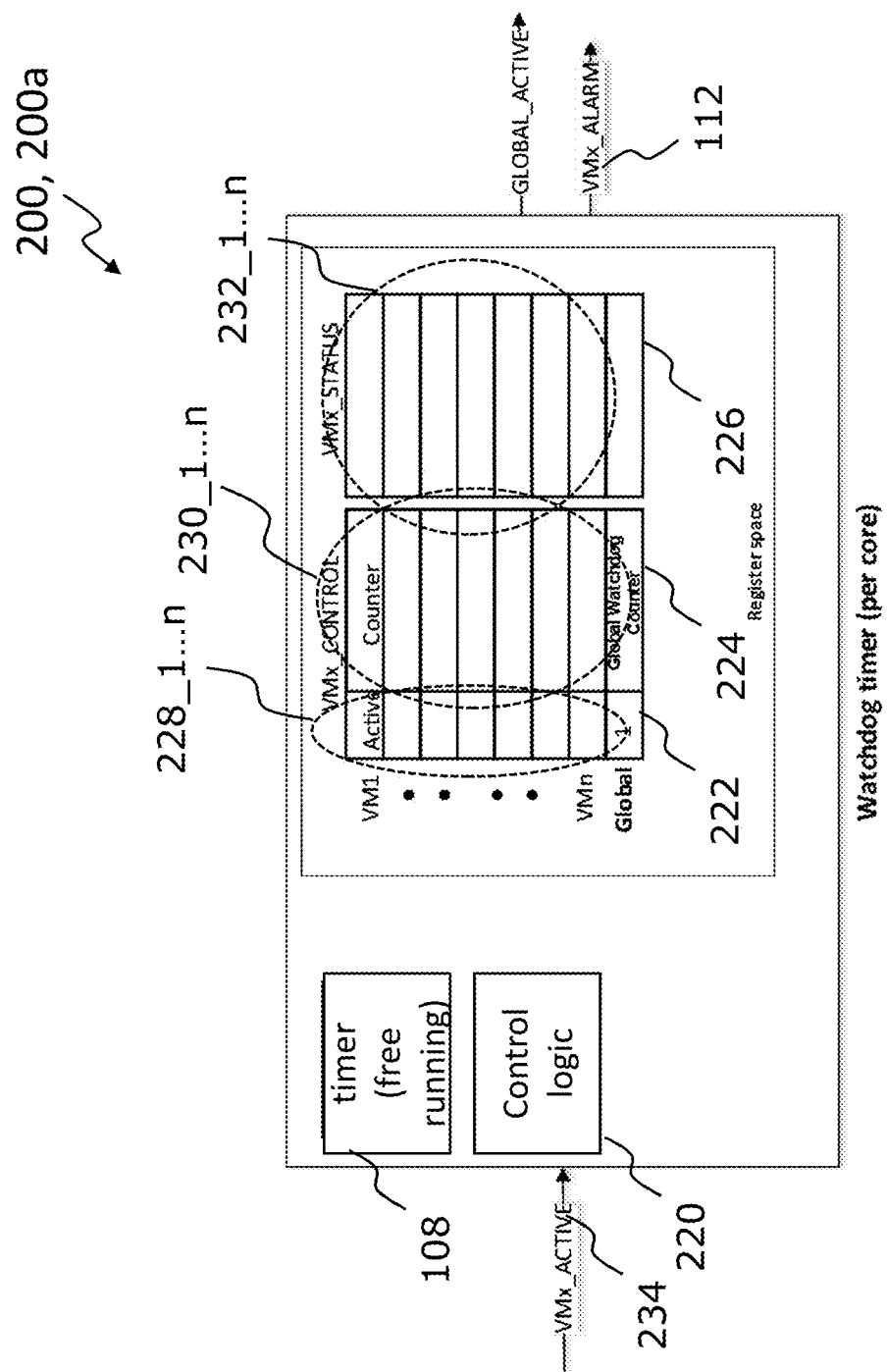
FIG. 2B shows a schematic view of a watchdog circuit in accordance with various embodiments.
Figure 2B:
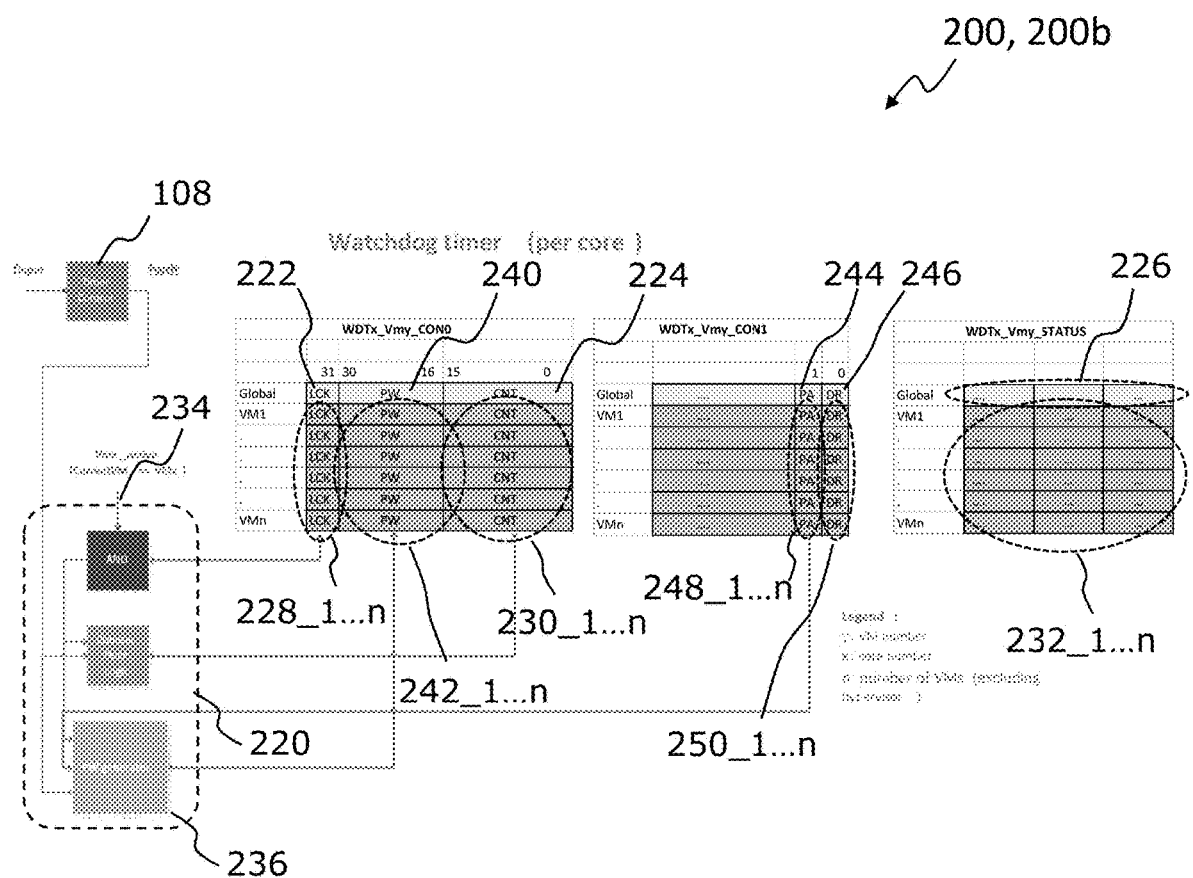
Figure 3:
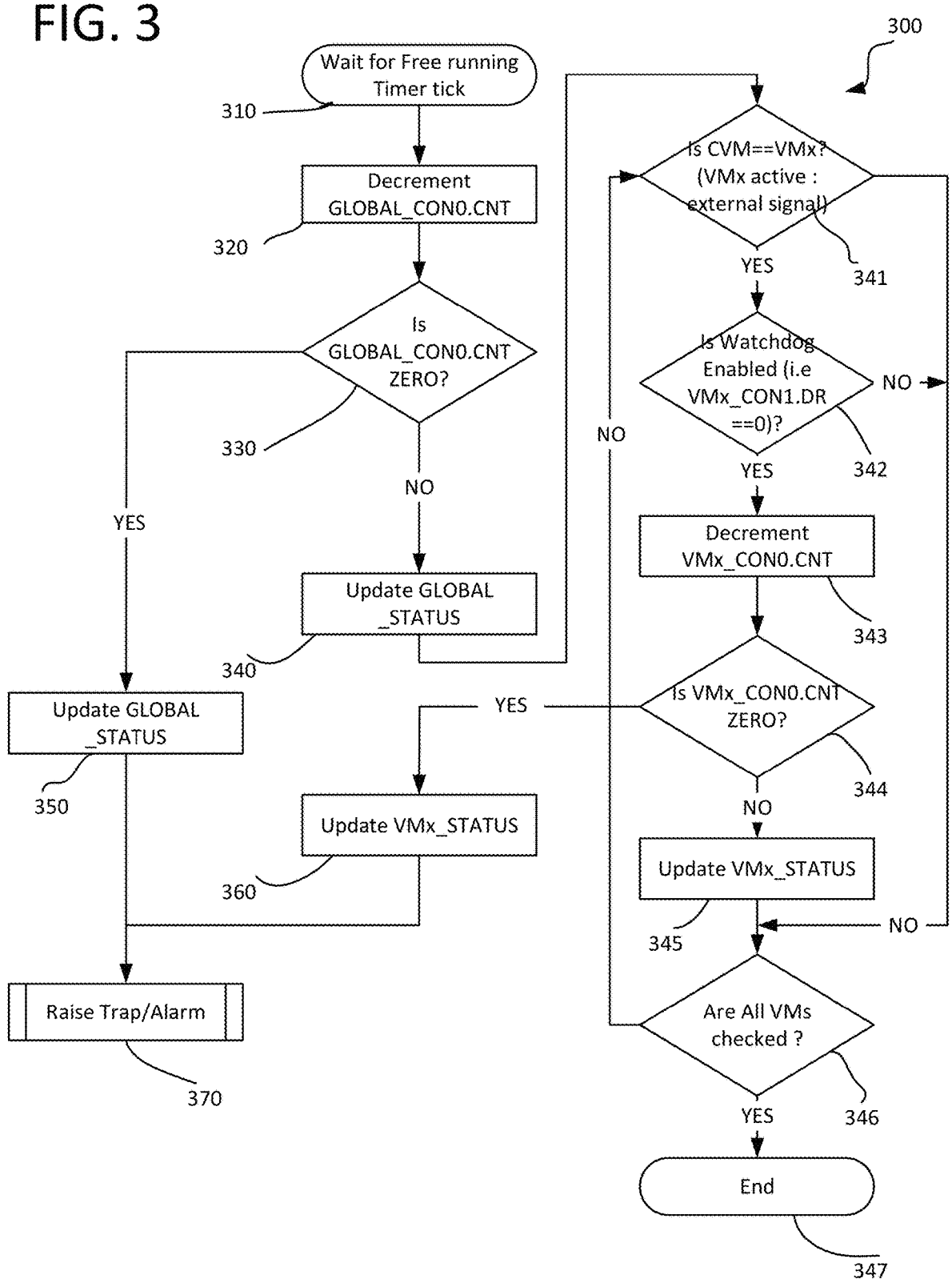
FIG. 3 shows a flow diagram of a method of operating a watchdog circuit in accordance with various embodiments.

Each of FIG. 2A and FIG. 2B shows a schematic view of a watchdog circuit 200 in accordance with various embodiments, wherein FIG. 2A shows the watchdog circuit 200a, and FIG. 2B shows the watchdog circuit 200b. FIG. 3 shows a flow diagram 300 of a method of operating a watchdog circuit in accordance with various embodiments, for example the watchdog circuit(s) 200 of FIG. 2A and/or 2B. Each of FIG. 4A to FIG. 4C shows flow diagrams 400a, 400b, and 400c, respectively, of aspects of a method of operating a circuit in accordance with various embodiments. The method for operating the circuit may integrate at least one of the methods of operating the watchdog circuit, for example of the method as described in context with FIG. 3 and/or FIG. 5. FIG. 5 shows a flow diagram 500 of a method of operating a watchdog circuit in accordance with various embodiments, for example one of the watchdog circuits 200 of FIG. 2A and/or 2B. FIG. 6 shows a schematic view of a data processing system 600 in accordance with various embodiments.

The watchdog circuit 200 may be configured to monitor one or more virtual machines 662 (see FIG. 6). The watchdog circuit 200 may for example be part of the data processing system 600, for example of a system-on-chip. The data processing system, e.g. the SoC, may include at least one processor 660, for example a multi-core processor. In the case of the multi-core processor, a plurality of watchdog circuits 200 in accordance with various embodiments may be provided, one for each virtual machine 662. In other words, each of the multiple processor cores may have an assigned watchdog circuit 200.

The watchdog circuit 200 may include a first memory portion 224 and a second memory portion 230_1 . . . n. The first memory portion 224 may be configured to store one or more bits, and the second memory portion 230_1 . . . n may be configured to store at least n bits, e.g. at least one bit per virtual machine 662, for example as described below.

The first memory portion 224 and the second memory portion 230_1 . . . n may be part of a memory, for example of a register or any other suitable type of memory.

The watchdog circuit 200 may be operated as an outer loop, also referred to as global watchdog, and an inner loop, also referred to as the local watchdog(s), which may cycle through all active virtual machines 662. Actions executed as part of the global watchdog and as part of the local watchdog are described below.

The global watchdog may be activated, for example by a hypervisor. A third memory portion 222 may be provided (with at least one bit) for storing the information whether the global watchdog circuit 200 is active.

The watchdog circuit 200 may include a control logic 220. The control logic 220 may be configured to perform a plurality of tasks when starting the watchdog circuit 200.

The tasks may include storing of a global watchdog counter value in the first memory portion 224, and storing of a local counter value for each virtual machine 662 of the one or more virtual machines 662 in the second memory portion 230_1 . . . n. The number of virtual machines 662 may be n, wherein n is between 1 and a maximum number of virtual machines 662 that may reasonably be operated or may be present in a given data processing system 600. Each of the n virtual machines 662 may have its dedicated bit or bits in the second memory portion 230_1 . . . n. For example, in bit(s) 230_1 of the second memory portion 230_1 . . . n, the local counter value for the first of the virtual machines 662 may be stored, in bit(s) 230_2 of the second memory portion 230_1 . . . n, the local counter value for the second of the virtual machines 662 may be stored, and so forth. This may apply mutatis mutandis to other memory portions provided with a similar reference number.

In other words, at a startup of the watchdog circuit 200, the global watchdog counter value and each of the local counter values may be initialized. The global watchdog counter value and each of the local counter values may be selected in such a way that during a regular, timely operation, a predefined global watchdog reference criterion and predefined local watchdog reference criteria will not be fulfilled. In other words, a predefined action that may be initiated by the watchdog circuit 200, like for example a notification, a system reset, etc., may be prevented.

For example, as will be explained in an exemplary fashion below, the global watchdog counter value and each of the local counter values may be set to values that are greater than zero, which may be decremented by a predefined amount—usually 1—during each watchdog cycle, and the predefined global watchdog reference criterion and predefined local watchdog reference criteria may for example be zero. In this example, the global watchdog counter value and each of the local counter values may be large enough to not reach zero during normal, timely operations of the virtual machines 662. In other exemplary embodiments, the predefined global watchdog reference criterion and predefined local watchdog reference criteria may for example be larger than zero, the counter value may be incremented during each watchdog cycle, and the global watchdog counter value and each of the local counter values may be initially set to zero.

What is referred to above as a "watchdog cycle" may mean that the control logic 220 may further be configured to perform further actions after a predefined number of pulses of a provided clock signal. The clock signal may in various embodiments be provided by a free-running timer 108, which may be part of the watchdog circuit 200, e.g. decoupled from a system clock. In other embodiments, the system clock may be used for providing the clock signal.

The further actions may include modifying the global watchdog counter value by a predefined amount. For example, if the global watchdog counter value is larger than the global watchdog reference value, the global watchdog counter value may be decremented by a predefined amount, e.g. by one or more, and if the global watchdog counter value is smaller than the global watchdog reference value, the global watchdog counter value may be incremented by a predefined amount, e.g. by one or more).

The further actions may further include determining, whether the modified global watchdog counter value fulfills a predefined global watchdog reference criterion, for example if the global watchdog counter value is equal to the predefined global watchdog reference value (or, in the decrementing case, lower than the predefined global watchdog reference value, or, in the incrementing case, higher than the predefined global watchdog reference value).

If the global watchdog counter value does not fulfill the predefined global watchdog reference criterion, the further actions may include executing yet further actions, which may be executed for each active virtual machine 662 of the one or more virtual machines 662.

The yet further actions may include modifying the local watchdog counter value (of the virtual machine 662 currently being processed) by a predefined amount. For example, if the local watchdog counter value is larger than the local watchdog reference value (which may be individually defined for each of the virtual machines 662, but may in an exemplary embodiment be set to, e.g., zero for each of the virtual machines 662), the local watchdog counter value may be decremented by a predefined amount, e.g. by one or more, and if the local watchdog counter value is smaller than the local watchdog reference value (which may be individually defined for each of the virtual machines 662, but may in an exemplary embodiment be set to, e.g., the same non-zero number for each of the virtual machines 662), the global watchdog counter value may be incremented by a predefined amount, e.g. by one or more).

The yet further actions may further include determining whether the modified local watchdog counter value (of the virtual machine 662 currently being processed) fulfills the predefined local watchdog reference criterion, for example if the local watchdog counter value is equal to the predefined local watchdog reference value (or, in the decrementing case, lower than the predefined local watchdog reference criterion, or, in the incrementing case, higher than the predefined local watchdog reference value).

The yet further actions may further include executing a predefined action 112 if the local watchdog counter value fulfills the predefined local watchdog reference criterion. The predefined action may include actions typically initiated by watchdog circuits, such as a system reset, sending of a notification, a system shutdown (possibly after saving relevant data first), raising an alarm/trap, etc.

The control logic 220 may further be configured to execute the predefined action if the global watchdog counter value fulfills the predefined global watchdog reference criterion.

The control logic 220 may in various embodiments further be configured to determine which of the one or more virtual machines 662 is active. This may happen before the yet further actions are executed, because the yet further actions may only be executed for the active virtual machines 662.

In various embodiments, the control logic 234 may be configured to receive an information 234, for example from outside the control logic 234, about which of the virtual machines 662 are active. The information 234 may in various embodiments be stored in a fourth memory portion 228_1 . . . n. The fourth memory portion 228_1 . . . n may include at least one bit per virtual machine 662 for storing whether the respective virtual machine 662 is active. In various embodiments, for example if no information 234 regarding which virtual machine 662 is active is provided to the control logic 234, the control logic 234 may be configured to actively retrieve the information, for example from the fourth memory portion 228_1 . . . n.

For deactivating any of the virtual machines (e.g. before servicing it, in other words, before resetting its local watchdog counter value, for example as described in context with FIG. 4A or FIG. 4C, or for other purposes), a value indicating a deactivation of the virtual machine may be stored in respective bit(s) of the fourth memory portion 228_1 . . . n. After the resetting the local watchdog counter value, a value indicating an activation of the virtual machine may be stored in the respective bit(s) of the fourth memory portion 228_1 . . . n.

In various embodiments, the watchdog circuit 200 may be configured to prevent an unauthorized triggering of the predefined action, and also to ensure that a triggering of the predefined action is not unduly prevented. This may be achieved by requesting and verifying a password before permitting the global watchdog counter value and/or any of the local watchdog counter values to be modified. For example, the control logic 220 may be configured to run a password unlock sequence before permitting the the modifying of the global watchdog counter value and/or before the modifying of the local watchdog counter value. The hypervisor may in various embodiments be requested (e.g. by the control logic 220) to provide a password, and the password may need to be successfully verified, before the hypervisor is granted permission to write to the first memory portion 224. Similarly, each of the virtual machines 662 may in various embodiments be requested (e.g. by the control logic 220) to provide a password, and the password may need to be successfully verified, before the virtual machine 662 is granted permission to write to its assigned bits of the second memory portion 330_1 . . . n.

For the verification, one or more reference passwords may be required.

The control logic 220 may thus further be configured to store at least one reference password, for example one reference password for modifying the global watchdog counter value, and one reference password for each of the at least one local watchdog counter value to be modified. The reference password for modifying the global watchdog counter value may for example be stored in a fifth memory portion 240, and the at least one reference password for modifying the at least one local watchdog counter value may be stored in a sixth memory portion 242_1 . . . n.

The control logic 220 may further be configured to generate the at least one password(s) that may be stored in the fifth memory portion 240 and/or in the sixth memory portion 242_1 . . . n. The control logic 220 may for example include a password processing circuit 236 for this purpose. For individually controlling whether a password is required, a seventh memory portion 244 may optionally be provided for the global watchdog counter value, and an eighth memory portion 248_1 . . . n may be provided for each of the local watchdog counter values. For example, if a "1" is stored in bit 248_2, a password may be required for modifying the local watchdog counter value of the second virtual machine, and if a "0" is stored in bit 248_2, the modifying of the local watchdog counter value of the second virtual machine may be permitted without providing a valid password.

Further optionally, an application of the watchdog circuit 200 to each of the virtual machines and as the general watchdog may be controlled by control bits stored in a ninth memory portion 250_1 . . . n for the virtual machines and a tenth memory portion 246 for the global watchdog (see FIG. 2B).

In various embodiments, the storing of the global watchdog counter value and the modifying of the global watchdog counter value may be provided by a hypervisor software.

In various embodiments, the one or more virtual machines may be configured to execute the storing of the local counter value and the modifying of the local watchdog counter value.

The exemplary embodiments of FIGS. 2A and 2B, and of FIG. 3, which illustrates a functional behavior of the watchdog circuit 200, will be briefly described in the following, where appropriate in context with FIGS. 4A and 4B, which illustrate some of the software handling of the watchdog circuit 200.

One watchdog circuit 200 per core may be provided, along with a global watchdog counter (in the first memory portion 224) and counter registers (the second memory portion 230_1 . . . n) for each virtual machine 662.

At the startup of the watchdog circuit 200, the global and local watchdog counter values, each of which may be a natural number, may be loaded into their respective registers 224 and 230_1 . . . n, and the watchdog circuit 200 may be enabled.

As shown for example in FIG. 4A, the global watchdog service handler (the hypervisor, which may also be referred to as a virtual machine monitor) may be started or called (at 460a) for the setting of the global watchdog counter value (at 470a), and subsequently this function (at 480a) may be ended. In other words, the global watchdog may be handled and serviced by the hypervisor software.

The local counter watchdog value may be loaded by the respective virtual machine software itself, which may be started or called (at 410a), may set the local watchdog counter value (at 430a), enable the local watchdog (at 440a), and then end the function (at 450a). In other words, the local (virtual machine) watchdog may be handled and serviced by the virtual machine software. This is illustrated for example also in FIG. 4A.

For the initial setting of the local counter watchdog value, a disabling of the local watchdog (at 420a) may be omitted, since the local watchdog is not yet active.

After the activation, an operation of the watchdog circuit 200 may be as follows (see, e.g., FIG. 3):

At each of the free running timer ticks (310, or a differently predefined duration), the global watchdog counter may be decremented (e.g. by 1) (320) and compared to zero (330).

If the global watchdog counter value is zero, a global watchdog status may be updated (350), for example to indicate that a predefined watchdog criterion has been fulfilled. The status may be stored in a twelfth memory portion 226. Furthermore, a trap and/or an alarm may be triggered (370).

If the global watchdog counter value is non-zero, the global watchdog status may be updated (340), e.g. in the twelfth memory portion 226, for example to indicate that a predefined watchdog criterion had not been fulfilled, and the watchdog circuit 200 may proceed to the "inner loop".

The "inner loop" may include checking whether the currently processed of the virtual machines is active (341), for example as described above, e.g. by input from an outside and by retrieving the information from the associated bit(s) of the fourth memory portion 228_1 . . . n.

If the currently processed of the virtual machines is active, the "inner loop" may further include checking whether the watchdog service is to be applied to the currently processed virtual machine 662, for example by retrieving the information from the respective bit(s) of the ninth memory portion 250_1 . . . n (342).

It may further include decrementing the local watchdog counter value of the associated bit(s) of the currently processed virtual machine 662 stored in the second memory portion 226_1 . . . n by 1 (343), and subsequently comparing the decremented value to zero (344).

Optionally, a status of the currently processed virtual machine may be updated, e.g. stored in respective bits of an eleventh memory portion 232_1 . . . n, e.g. in bit(s) 232_1 for the first virtual machine, in 232_2 for the second virtual machine, and so forth, wherein the status update 360 may be relevant for the case that the decremented local watchdog counter value is zero, and the status update 345 may be relevant for the case that it is unequal to zero, e.g. larger than zero.

A trap/an alarm 112 (and/or a different suitable predefined action) may be triggered if the local watchdog counter value is zero (370).

When the processing of the currently processed virtual machine 662 is finished, it may be checked whether this is the last virtual machine 662 to be processed (346). If not, the subsequent virtual machine 662 may be processed. Otherwise, the inner loop ends (347). The global loop may be started anew with the next timer signal.

To summarize a functionality of the "inner loop", the local watchdog counter value for each of the virtual machines may be decremented on each watchdog tick if the virtual machine 662 is active. If any of the local watchdog counter values is not reloaded before it reaches zero, then an alarm/trap 112 may be raised to indicate that the watchdog circuit 200 has not been serviced for that virtual machine 662.

As described above, a servicing of the virtual machine (local) watchdog may be performed by the software of the respective virtual machine 662. In other words, the software of each of the virtual machines 662 may reset the respective associated counter that may be stored in the dedicated bits of the second memory portion 230_1 . . . n. The servicing process for servicing the local watchdog(s) may run in parallel to the watchdog itself.

A respective servicing process is illustrated in FIG. 4A (left) and in FIG. 4C.

In a rather basic mode shown in FIG. 4A (left), an operation of the virtual machine 662 watchdog servicing function, e.g. of the resetting of the local watchdog counter value(s) in the second memory portion 230_1 . . . n, may be as follows:

The local watchdog service handler, which may be part of the software of the virtual machine for which the local watchdog counter value is to be reset, may be activated (410a).

The watchdog functionality may be deactivated for the currently processed virtual machine (420a). This may for example be achieved by setting respective bit(s) of the fourth memory portion 228_1 . . . n to a value indicating a deactivation of the currently processed virtual machine. Thereby, a problem that might have arisen if the control logic of the watchdog circuit 200 and the virtual machine 662 had accessed the second memory portion 230_1 . . . n at the same time may be avoided.

Subsequently, the local watchdog counter value for the currently processed virtual machine 662 may be reloaded/reset (430a), for example by storing a suitable value (e.g. as described above, e.g. the initial value) in the allocated bits of the second memory portion 230_1 . . . n.

After the resetting the local watchdog counter value, a value indicating an activation of the virtual machine 662 may be stored in the respective bit(s) of the fourth memory portion 228_1 . . . n, such that the watchdog functionality may be resumed for the currently processed virtual machine 662. In other words, the watchdog may be enabled again for the currently processed virtual machine (440a). This ends the virtual machine servicing process (450a).

The local watchdog servicing process illustrated in FIG. 4C may be similar to the local watchdog servicing process of FIG. 4A, with the difference that a modification/reset of the local watchdog counter value, e.g. a writing to the allocated bits of the second memory portion 230_1 . . . n, may be password protected.

An activating of the local watchdog service handler (410*c*), deactivating of the watchdog functionality for the currently processed virtual machine (420*c*), reloading/resetting of the local watchdog counter value for the currently processed virtual machine 662 (430*c*), re-enabling of the watchdog service for the currently processed virtual machine (440*c*), and ending of the virtual machine servicing process (450*c*) may be similar or identical to the corresponding processes described in context with FIG. 4A.

However, before the reloading/resetting of the local watchdog counter value for the currently processed virtual machine 662 (430*c*), a password unlock sequence may be followed (429*c*). As part of the password unlock sequence, the currently processed virtual machine may be required to provide a password, for example to the watchdog circuit 200, and only upon successful verification, for example by the control logic 220, may the virtual machine 662 be granted permission to reload/reset the local watchdog counter.

As described above, a servicing of the global watchdog may be performed by the hypervisor. In other words, the hypervisor may reset the global counter that may be stored in the first memory portion 224. The servicing process for servicing the global watchdog may run in parallel to the watchdog itself.

The rather basic servicing process mode shown in FIG. 4A (right) was described earlier for the initial setting of the global watchdog counter value. The servicing process executed in parallel to the watchdog operation may in various embodiments be similar or identical.

FIG. 4B illustrates a more elaborate global watchdog servicing process, in which a password protection of the modification/reset of the global watchdog counter value, e.g. a writing to the allocated bits of the first memory portion 224, may be provided.

An activating of the hypervisor (460*b*), reloading/resetting of the global watchdog counter value (470*b*), and ending of the global watchdog servicing process (480*b*) may be similar or identical to the corresponding processes described in context with FIG. 4A.

Additionally, a disabling of the global watchdog (465*b*) before the reloading/resetting of the global watchdog counter value (470*b*) and a re-enabling of the global watchdog (475*b*) after the reloading/resetting of the global watchdog counter value (470*b*) may be provided (with or without the password protection of the reloading/resetting of the global watchdog counter value (470*b*)). This may be achieved by storing values indicating a deactivation or an activation, respectively, of the global watchdog in the third memory portion 222.

However, before the reloading/resetting of the global watchdog counter value (470*b*), a password unlock sequence may be followed (469*b*). As part of the password unlock sequence, the hypervisor may be required to provide a password, for example to the watchdog circuit 200, and only upon successful verification, for example by the control logic 220, may the hypervisor be granted permission to reload/reset the global watchdog counter, e.g. to write to the first memory portion 224.

FIG. 5A shows a flow diagram 500 of a method of operating a watchdog circuit for monitoring a plurality of virtual machines provided by one core of a plurality of cores in accordance with various embodiments.

The method may include starting the watchdog circuit (510), storing a global watchdog counter value in a first memory portion (520), storing a local counter value for each virtual machine of the one or more virtual machines in a second memory portion (530), counting a number of pulses (540), modifying the global watchdog counter value and the local watchdog counter values (550), and, if the global watchdog counter value fulfills a predefined global watchdog reference criterion or any of the local watchdog counter value fulfills a predefined local watchdog reference criterion (560), outputting an error signal (570).

FIG. 5B shows a flow diagram 501 of a method of operating a watchdog circuit in accordance with various embodiments.

The method may include starting the watchdog circuit (511), storing a global watchdog counter value in a first memory portion (521), storing a local counter value for each virtual machine of the one or more virtual machines in a second memory portion (531), waiting for a duration corresponding to a predefined number of pulses of a provided clock signal (541), modifying the global watchdog counter value by a predefined amount (551), determining whether the modified global watchdog counter value fulfills a predefined global watchdog reference criterion (561), and, if the global watchdog counter value does not fulfill the predefined global watchdog reference criterion, for each active virtual machine of the one or more virtual machines: modifying the local watchdog counter value by a predefined amount (571), determining whether the modified local watchdog counter value fulfills a predefined local watchdog reference criterion (581), and, if the local watchdog counter value fulfills the predefined local watchdog reference criterion, executing a predefined action (590B).

In various embodiments, the predefined action may also be executed if the global watchdog counter fulfills the predefined global watchdog reference criterion.

In various embodiments, if the local watchdog counter value does not fulfill the predefined local watchdog reference criterion, the process may end (590A).

The above described embodiments may reduce a complexity of a customer software component that interacts with the watchdog circuit 200. Furthermore, a performance of the system may be enhanced and a memory footprint may be reduced. Furthermore, a user providing a virtual machine software may not need to develop and maintain the watchdog handler software. It may be sufficient to interact with the independent watchdog circuit 200 as described above.

A switching time of virtual machine contexts may be unaffected by the watchdog circuit 200.

In various embodiments, the watchdog circuit 200 may be versatile, in that it may not be limited to a single chip generation, but may be used for various chip generations.

Various examples will be illustrated in the following:

Example 1 is a watchdog circuit for monitoring a plurality of virtual machines provided by one core of a plurality of cores. The watchdog circuit may include a first memory portion, a second memory portion, and a control logic configured to count a number of pulses, to, when starting the watchdog circuit, store a global watchdog counter value in the first memory portion, and to store a local counter value for each virtual machine of the one or more virtual machines in the second memory portion, and, after a predefined number of pulses, to modify the global watchdog counter value and the local counter values, and, if the global watchdog counter value fulfills a predefined global watchdog reference criterion or any of the local watchdog counter values fulfills a predefined local watchdog reference criterion, to output an error signal.

In Example 2, the subject-matter of Example 1 may optionally include that the global watchdog counter is configured to be resettable by a hypervisor, and that each of the local watchdog counters is configured to be resettable by the corresponding virtual machine.

Example 3 is a watchdog circuit for monitoring one or more virtual machines. The watchdog circuit may include a first memory portion, a second memory portion, and a control logic configured to, when starting the watchdog circuit, store a global watchdog counter value in the first memory portion, and to store a local counter value for each virtual machine of the one or more virtual machines in the second memory portion. The control logic may further be configured to, after a predefined number of pulses of a provided clock signal, modify the global watchdog counter value by a predefined amount, to determine, whether the modified global watchdog counter value fulfills a predefined global watchdog reference criterion, and, if the global watchdog counter value does not fulfill the predefined global watchdog reference criterion, to execute for each active virtual machine of the one or more virtual machines: modify the local watchdog counter value by a predefined amount, determine, whether the modified local watchdog counter value fulfills a predefined local watchdog reference criterion, and, if the local watchdog counter value fulfills the predefined local watchdog reference criterion, execute a predefined action.

In Example 4, the subject-matter of any of Examples 1 to 3 may optionally include that the control logic is further configured to determine which of the one or more virtual machines is active.

In Example 5, the subject-matter of Example 4 may optionally further be configured to determine for each active virtual machine of the one or more virtual machines whether the modified local watchdog counter value fulfills the predefined local watchdog reference criterion if the global watchdog counter value does not fulfill the predefined global watchdog reference criterion.

In Example 6, the subject-matter of Example 1 to 5 may optionally include that the control logic is further configured to store at least one password, and to request and verify the at least one password before the storing and before the modifying of the global watchdog counter value and before the storing and before the modifying of the local watchdog counter value.

In Example 7, the subject-matter of Example 6 may optionally include that the at least one password includes separate passwords for the modifying of the global watchdog counter value and for each of the local watchdog counter values.

In Example 8, the subject-matter of any of Examples 1 to 7 may optionally further include a timer for providing the clock signal providing the counted pulses.

In Example 9, the subject-matter of Example 8 may optionally include that the timer is a free-running system clock.

In Example 10, the subject-matter of any of Examples 3 to 9 may optionally further include a password generator for generating the at least one password.

Example 11 is a circuit including the watchdog circuit of any of examples 1 to 10, a hypervisor configured to reset the global counter value to the initial global watchdog counter value before the global watchdog counter value fulfills the predefined global watchdog reference criterion, and the plurality of virtual machines, wherein each of the virtual machines is configured to reset its corresponding local watchdog counter value to the initial local watchdog counter value before the local watchdog counter value fulfills the predefined local watchdog reference criterion.

Example 12 is a data processing system configured to operate at least one virtual machine, including at least one processor and at least one watchdog circuit in accordance with any of Examples 1 to 11.

In Example 13, the data processing system of Example 12 is a system-on-chip.

In Example 14, the data processing system of Example 12 or 13 further includes that the processor is a multi-core processor, and that the at least one watchdog circuit includes a plurality of watchdog circuits, wherein each of the multiple cores has an assigned watchdog circuit of the plurality of watchdog circuits.

Example 15 is a method of operating a watchdog circuit for monitoring a plurality of virtual machines provided by one core of a plurality of cores. The method may include starting the watchdog circuit, storing a global watchdog counter value in a first memory portion, storing a local counter value for each virtual machine of the one or more virtual machines in a second memory portion; counting a number of pulses, and modifying the global watchdog counter value and the local watchdog counter values if the global watchdog counter value fulfills a predefined global watchdog reference criterion or any of the local watchdog counter value fulfills a predefined local watchdog reference criterion, output an error signal.

Example 16 is a method of operating a watchdog circuit for monitoring one or more virtual machines, the method including starting the watchdog circuit, storing a global watchdog counter value in a first memory portion, storing a local counter value for each virtual machine of the one or more virtual machines in a second memory portion, waiting for a duration corresponding to a predefined number of pulses of a provided clock signal, modifying the global watchdog counter value by a predefined amount, determining whether the modified global watchdog counter value fulfills a predefined global watchdog reference criterion, and, if the global watchdog counter value does not fulfill the predefined global watchdog reference criterion, for each active virtual machine of the one or more virtual machines: modifying the local watchdog counter value by a predefined amount, determining whether the modified local watchdog counter value fulfills a predefined local watchdog reference criterion, and, if the local watchdog counter value fulfills the predefined local watchdog reference criterion, executing a predefined action.

In Example 17, the method of Example 15 or 16 may further include determining which of the one or more virtual machines is active.

In Example 18, the method of Example 17 may further include determining, for each active virtual machine of the one or more virtual machines, whether the modified local watchdog counter value fulfills the predefined local watchdog reference criterion if the global watchdog counter value does not fulfill the predefined global watchdog reference criterion.

In Example 19, the method of any of Examples 15 to 18 may further include storing at least one password and requesting and verifying the at least one password before the storing and before the modifying of the global watchdog counter value and before the storing and before the modifying of the local watchdog counter value.

In Example 20, the method of Example 19 may further include that the at least one password includes separate passwords for the modifying of the global watchdog counter value and for each of the local watchdog counter values.

In Example 21, the method of any of Examples 15 to 20 may further include that each of the one or more virtual machines is configured to execute the storing the local counter value and the modifying the local watchdog counter value.

In Example 22, the method of any of Examples 15 to 21 may further include that the watchdog circuit further includes a timer for providing the clock signal.

In Example 23, the method of Example 22 may further include that the timer is a free-running system clock.

In Example 24, the method of any of Examples 19 to 23 may further include that the watchdog circuit further includes a password generator for generating the at least one password.

Example 25 is a method of operating a circuit including a watchdog circuit, a hypervisor, and a plurality of virtual machines, the method including operating the watchdog circuit in accordance with any of Examples 15 to 24, resetting, using the hypervisor, the global counter value to the initial global watchdog counter value before the global watchdog counter value fulfills the predefined global watchdog reference criterion, and resetting, by each of the virtual machines, its corresponding local watchdog counter value to the initial local watchdog counter value before the local watchdog counter value fulfills the predefined local watchdog reference criterion.

Example 26 is a method of operating a data processing system configured to operate at least one virtual machine, including at least one processor and at least one watchdog circuit, the method may include operating the plurality of watchdog circuits in accordance with the method of any of Examples 15 to 24.

In Example 27, the method of Example 26 further includes that the data processing system is a system-on-chip.

In Example 28, the data processing system of Example 26 or 27 further includes that the processor is a multi-core processor, and that the at least one watchdog circuit includes a plurality of watchdog circuits, wherein each of the multiple cores has an assigned watchdog circuit of the plurality of watchdog circuits.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A watchdog circuit for monitoring one or more virtual machines provided by one core of a plurality of cores, the watchdog circuit comprising:
   a first memory portion;
   a second memory portion; and
   a control logic configured to:
   count a number of pulses;
   when starting the watchdog circuit:
      store a global watchdog counter value in the first memory portion; and
      store a local watchdog counter value for each virtual machine of the one or more virtual machines in the second memory portion;
   after a predefined number of pulses:
      modify the global watchdog counter value and the local watchdog counter values; and
      if the global watchdog counter value fulfills a predefined global watchdog reference criterion or any of the local watchdog counter values fulfills a predefined local watchdog reference criterion, output an error signal.

2. The watchdog circuit of claim 1,
wherein the global watchdog counter is configured to be resettable by a hypervisor, and wherein each of the local watchdog counters is configured to be resettable by a corresponding virtual machine.

3. The watchdog circuit of claim 1,
wherein the control logic is further configured to determine which of the one or more virtual machines is active.

4. The watchdog circuit of claim 3, further comprising:
if the global watchdog counter value does not fulfill the predefined global watchdog reference criterion, execute for each active virtual machine of the one or more virtual machines:
   determine, whether the modified local watchdog counter value fulfills the predefined local watchdog reference criterion.

5. The watchdog circuit of claim 1,
wherein the control logic is further configured to store at least one password, and to request and verify the at least one password before the storing and before the modifying of the global watchdog counter value and before the storing and before the modifying of the local watchdog counter value.

6. The watchdog circuit of claim 5,
wherein the at least one password comprises separate passwords for the modifying of the global watchdog counter value and for each of the local watchdog counter values.

7. The watchdog circuit of claim 1, further comprising:
a timer configured to provide a clock signal providing the counted pulses.

8. The watchdog circuit of claim 7,
wherein the timer is a free-running system clock.

9. The watchdog circuit of claim 5, further comprising:
a password generator configured to generate the at least one password.

10. A circuit comprising:
the watchdog circuit of claim 1;
a hypervisor configured to reset the global counter value to an initial global watchdog counter value before the global watchdog counter value fulfills the predefined global watchdog reference criterion; and
the one or more of virtual machines, wherein each of the virtual machines is configured to reset its corresponding local watchdog counter value to an initial local watchdog counter value before the local watchdog counter value fulfills the predefined local watchdog reference criterion.

11. A system-on-chip comprising a multi-core processor, the system-on-chip comprising a plurality of watchdog circuits in accordance with claim 1,
wherein each of the plurality of cores has an assigned watchdog circuit of the plurality of watchdog circuits.

12. A method of operating a watchdog circuit for monitoring one or more virtual machines provided by one core of a plurality of cores, the method comprising:
 starting the watchdog circuit;
 storing a global watchdog counter value in a first memory portion;
 storing a local watchdog counter value for each virtual machine of the one or more virtual machines in a second memory portion;
 counting a number of pulses;
 after a predefined number of pulses:
 modifying the global watchdog counter value and the local watchdog counter values; and
 if the global watchdog counter value fulfills a predefined global watchdog reference criterion or any of the local watchdog counter value fulfills a predefined local watchdog reference criterion, outputting an error signal.

13. The method of claim 12, further comprising:
 determining which of the one or more virtual machines is active.

14. The method of claim 13, further comprising:
 if the global watchdog counter value does not fulfill the predefined global watchdog reference criterion, executing for each active virtual machine of the one or more virtual machines:
  determining whether the modified local watchdog counter value fulfills the predefined local watchdog reference criterion.

15. The method of claim 12, further comprising:
 storing at least one password; and
 requesting and verifying the at least one password before the storing and before the modifying of the global watchdog counter value and before the storing and before the modifying of the local watchdog counter value.

16. The method of claim 15,
 wherein the at least one password comprises separate passwords for the modifying of the global watchdog counter value and for each of the local watchdog counter values.

17. The method of claim 15, further comprising:
 generating, by a password generator, the at least one password.

18. The method of claim 12, further comprising:
 providing, by a timer, a clock signal.

19. The method of claim 18,
 wherein the timer is a free-running system clock.

20. A method of operating a circuit comprising the watchdog circuit, a hypervisor, and one or more virtual machines, the method comprising:
 operating the watchdog circuit in accordance with the method of claim 12;
 resetting, using the hypervisor, the global counter value to an initial global watchdog counter value before the global watchdog counter value fulfills the predefined global watchdog reference criterion; and
 resetting, by each of the virtual machines, its corresponding local watchdog counter value to an initial local watchdog counter value before the local watchdog counter value fulfills the predefined local watchdog reference criterion.

21. A method of operating a system-on-chip comprising a multi-core processor, wherein each of the plurality of has an assigned watchdog circuit of a plurality of watchdog circuits, the method comprising:
 operating the plurality of watchdog circuits in accordance with the method of claim 12.

* * * * *